United States Patent [19]

Brown et al.

[11] Patent Number: 4,619,860
[45] Date of Patent: Oct. 28, 1986

[54] FOAMED PHOSPHATE TILE PRODUCTS

[75] Inventors: David S. Brown; John S. Forry, both of Manor Township, Lancaster County; Nancy E. Mentzer, Lancaster; Donald J. Misselhorn, East Hempfield Township, Lancaster County, all of Pa.

[73] Assignee: Armstrong World Industries, Inc., Lancaster, Pa.

[21] Appl. No.: 750,187

[22] Filed: Jul. 1, 1985

[51] Int. Cl.[4] .......................... B32B 3/26; B32B 5/14; B32B 5/20
[52] U.S. Cl. .................................... 428/213; 428/218; 428/312.2; 428/314.4; 428/316.6; 428/44
[58] Field of Search ................ 428/44, 71, 218, 314.4, 428/316.6, 312.2, 213

[56] References Cited
U.S. PATENT DOCUMENTS
4,190,697 2/1980 Ahrens ........................... 428/218 X Primary Examiner—Alexander S. Thomas
Attorney, Agent, or Firm—Laird F. Miller

[57] ABSTRACT

The present invention relates to laminated acoustical tile products which are derived from compositions that are suitable to provide rigid, water-resistant phosphate ceramic materials. The tile products comprise a decorative facing comprising a substantially open-celled character and a backing layer of higher density, the backing layer and edges of the tile comprising substantially closed-celled facing characteristics. The backing layer provides structural strength and dimensional stability to the tile product whereas the decorative, open-celled facing provides access by sound waves to the interior regions of the board. The resulting composite material provides good acoustical performance, yet is capable of withstanding conventional handling stresses.

6 Claims, 5 Drawing Figures

U.S. Patent  Oct. 28, 1986  4,619,860
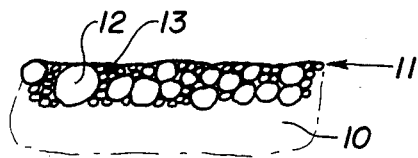
Fig. 1
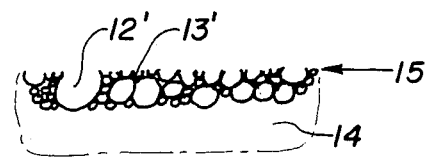
Fig. 2
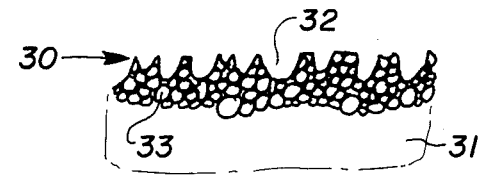
Fig. 5
Fig. 3
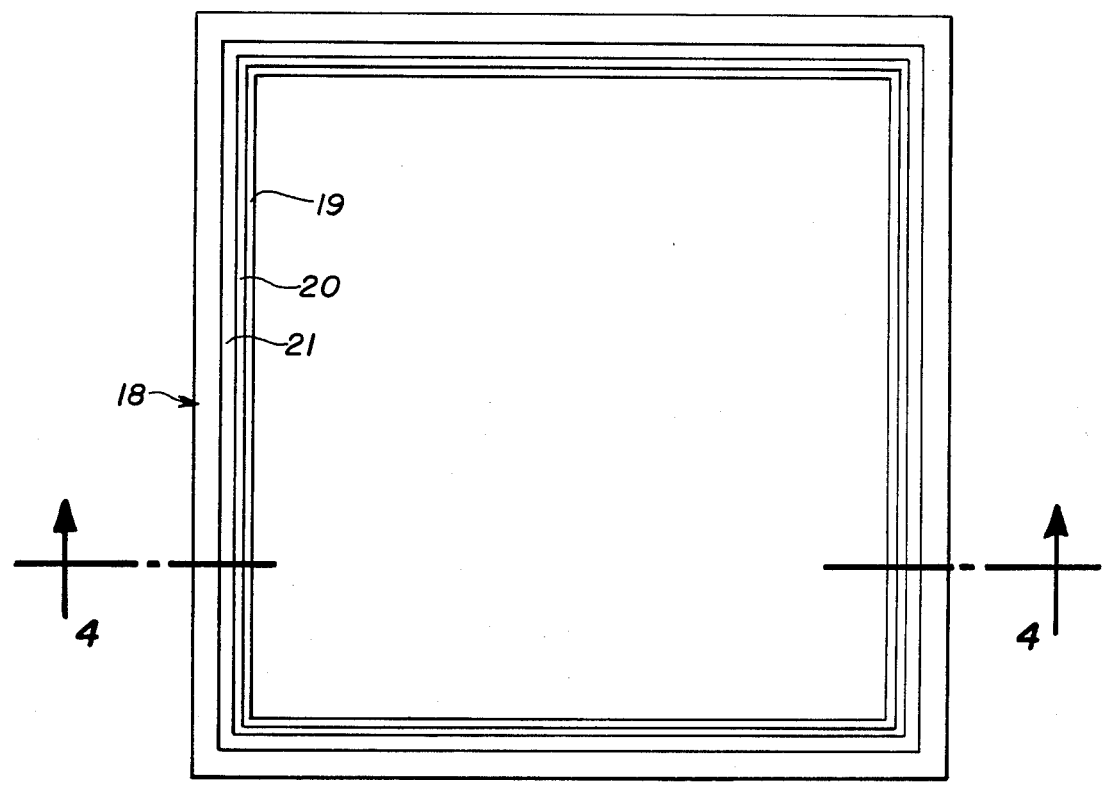
Fig. 4
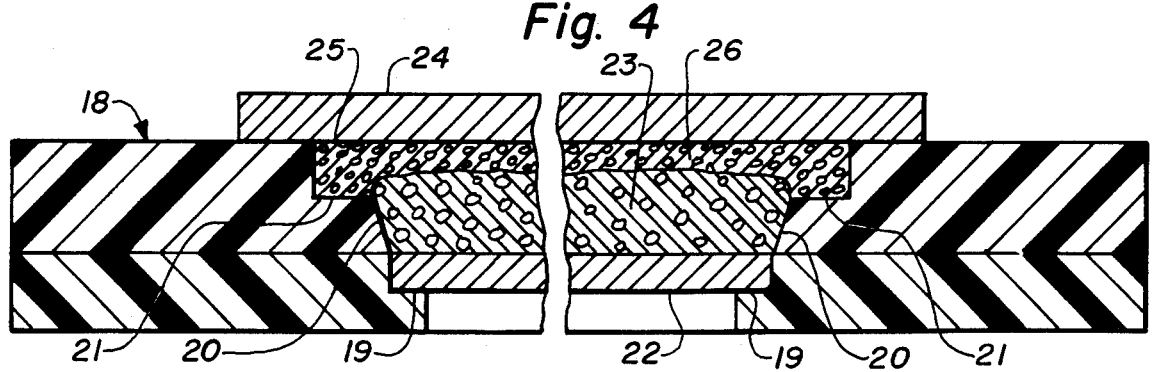

FOAMED PHOSPHATE TILE PRODUCTS

The present invention relates to tile products and, more particularly, to ceiling tile products derived from foamed phosphate materials.

BACKGROUND OF THE INVENTION

Acoustical building materials are widely used to control noise levels and reverberation in many different types of environments. Materials having a porous face are most commonly used to provide sound absorption. Sound enters through the face of the porous material and, as air moves back and forth within the material, the sound energy is converted into heat by friction. Conventionally, such acoustical material has been produced by wet-laying processes using slurries of suspended materials. The resulting products, however, have suffered from a variety of drawbacks. Specifically, because they are wet-laid, the fibers are closely packed so that sound cannot readily penetrate the board; thus, a wet-laid board usually must be perforated or fissured in order to obtain acceptable acoustical performance. In addition, excessive energy usage results from the use of wet-laid board products.

THE PRIOR ART

Wet-forming procedures for producing acoustical board are well known in the art. For example, U.S. Pat. Nos. 2,968,327; 2,995,198; 3,223,580; 3,286,784; and 3,779,862, all of which are owned by the assignee of the present invention, relate to various wet-forming techniques and wet-formed products which are used as acoustical materials. As indicated above, these materials typically provide acoustical control through the use of perforations or fissures. In addition, these materials have also been used in combination with fabric facing materials which are perforated.

Recently, U.S. Pat. No. 4,375,516, which is also owned by the assignee of the present invention, disclosed processes and compositions which could be used to provide rigid, water-resistant phosphate ceramic materials. Both foamed and unfoamed products were disclosed in this patent, and the foamed products appeared to offer the possibility of providing acoustically performing products. These materials were obtained either as boards which were faced with a scrim material, or as boards which had a closed-cell facing characteristic due to the nature of the surface against which they were cast. The closed-cell and some of the scrim-faced types of boards did not exhibit significant acoustical characteristics because sound waves could not readily penetrate the exterior surfaces of the boards. To obtain penetration, the scrim had to be removed from the surface of certain boards, or the closed-cell boards had to be sanded; however, this treatment led to a reduction in strength characteristics such that the facings and panel edges tended to become friable and brittle, thereby making the boards unsuitable for use in conventional ceiling systems.

Accordingly, one objective of the present invention was to provide an acoustical tile product which would have satisfactory strength, yet which retained its acoustical properties.

Another objective of the present invention was to provide acoustical products having decorative features as well as adequate strength.

These and other objectives of the present invention will become apparent from the detailed description of preferred embodiments which follow.

BRIEF DESCRIPTION OF THE DRAWINGS

FIG. 1 represents a typical closed-cell facing.

FIG. 2 represents an open-celled facing resulting from the abrasion of the structure of FIG. 1.

FIG. 3 represents a plan view of an edge frame.

FIG. 4 represents a partial cross-sectional view of a mold and mold cavity taken along lines 4—4 of FIG. 3.

FIG. 5 represents a non-abraded open-celled facing.

SUMMARY OF THE INVENTION

The present invention relates to laminated acoustical tile products which are derived from compositions that are suitable to provide rigid, water-resistant phosphate ceramic materials. The tile products comprise a decorative facing comprising a substantially open-celled character and a backing layer of higher density, the backing layer and edges of the tile comprising substantially closed-celled facing characteristics. The backing layer provides structural strength and dimensional stability to the tile product whereas the decorative, open-celled facing provides access by sound waves to the interior regions of the board. The resulting composite material provides good acoustical performance, yet is capable of withstanding conventional handling stresses.

DETAILED DESCRIPTION OF PREFERRED EMBODIMENTS

In one embodiment, the present invention relates to a molded tile product, said product comprising laminated first and second foamed phosphate ceramic materials, said materials being derived from the reaction of at least one composition comprising calcium silicate, phosphoric acid, a metal oxide and a carbonate foaming agent, said first material comprising the decorative facing of said tile and being less dense than said second material, said tile having a decorative facing comprising a selected open-celled character, the edges and backing face of said tile comprising a substantially closed-celled character.

In a second embodiment, the present invention relates to a process for providing a molded tile product, said process comprising the steps of preparing a first and, optionally, a second composition suitable to provide a first and, optionally, a second foamed phosphate ceramic material, said first composition and said optional second composition comprising calcium silicate, phosphoric acid, a metal oxide and a carbonate foaming agent, the components of said optional second composition being selected such that said second foamed material will be more dense than said first foamed material; disposing a layer of said first composition on a releasable support surface, said support surface comprising regions which are suitable to selectively provide an open-celled character to said first composition when foaming occurs; providing an edge frame for said support surface so as to create a mold cavity, said edge frame being constructed of a material which will provide a closed-celled character to the edges of said tile while selectively providing edge detail to said tile; permitting said first composition to foam and cure in said cavity; disposing a second layer of said first composition or, optionally, a layer of said second composition on said first foamed material in said cavity; providing a cover for said cavity, said cover comprising a release coating material which is suitable to provide a closed-celled character to the second foamed layer when said second layer foams in contact with said cover; permitting said second foamed layer to foam and cure under self-induced pressure in said cavity so as to be in substantial contact with said cover and said frame, whereby said second layer is provided with a closed-celled character and has a higher density than said first foamed layer; and demolding the cured tile.

The compositions which will be suitable to provide the tile products of the present invention will be derived from components comprising calcium silicate, phosphoric acid, one or more metal oxides and a carbonate foaming agent. Such compositions may be provided as disclosed in U.S. Pat. No. 4,375,516, the contents of which are incorporated herein by reference; however, it will be understood that other related compositions may also be utilized to provide suitable foamed phosphate materials, and that the present invention is not restricted to those compositions as described in the aforementioned U.S. Patent.

As previously explained, compositions which are produced from calcium silicate, phosphoric acid, a metal oxide and a carbonate foaming agent and are then formed into scrim-faced or closed-celled panel products often do not have characteristics which make them suitable for use as acoustical tile products. Although acoustical properties may be provided by creating an open-celled character in the facing (such as by removing the scrim or abrading the surface), the structural strength of the product decreases and the material exhibits increased friability problems. This may be visualized by reference to FIGS. 1 and 2. FIG. 1 illustrates a board 10 having a closed-celled facing 11 comprising large cells 12 and small cells 13. FIG. 2 illustrates a board 14 having an open-celled facing 15 of a type which might result from sanding the structure of FIG. 1, the structure having exposed abraded cells 12' and 13'. The structure of FIG. 2 would also be comparable to that which would be obtained by removing a scrim facing from a foamed structure. From these illustrations it will be seen why, until the present invention was made, many foamed phosphate materials were considered to be generally unsatisfactory as ceiling tile products.

It has been discovered that the disadvantages of using the phosphate ceramic materials may be overcome by providing structures comprising two laminated layers of phosphate ceramic materials, one layer being more dense than the other. Thus, if a tile product is constructed to have an open-celled phosphate facing material which is backed with a higher-density phosphate material, the backing material will provide a higher structural strength such that a stronger board is obtained. Preferably, this will be achieved by using different phosphate compositions in order to optimize cell sizes. Nevertheless, a single composition may also be used, the smaller cell size of the high-density layer resulting from self-induced pressure within the mold, as hereinafter discussed in more detail.

If the molding materials which are used to provide tile of the present invention are selected such that only the facing of the tile is provided with an open-celled character whereas the tile edges and back facing are provided with closed-celled character, increased structural strength and dimensional stability will be obtained. The closed-celled nature of the back facing also provides improved appearance and reduced friability whereby the boards may be used in a commercial suspended-ceiling environment.

One method which may be utilized to provide the products of the present invention is as follows. A layer of a foamable phosphate composition as described above is cast on a releasable support surface coated with a coating which is suitable to provide an open-celled phosphate ceramic material. Such coatings are disclosed in copending U.S. application Ser. No. 750,142, the contents of which are incorporated herein by reference. Of course, it will also be recognized, that the facing may be selectively provided with an open-celled character by utilizing a pattern of coating material which is suitable to provide an open-celled character in selected areas, and also a material which will provide a closed-celled character in other areas. It will further be recognized that a predominant amount of open-celled facing character is desired so as to provide acceptable acoustical access, as hereinafter discussed.

Once the phosphate composition is cast on the support surface which, in one preferred embodiment, may be a waxed plate, the plate may be provided with an edge frame such as frame 18 illustrated in the plan view of FIG. 3. Frame 18 is provided with flange areas 19 into which the waxed plate will fit. Frame 18 also possesses decorative edge moldings 20 and 21 which provide the edge detail to the resulting product. An abbreviated cross-sectional view is shown in FIG. 4 in which waxed plate 22 resides on flanges 19. Preferably, the edge frame will be constructed of a substantially rigid material which will provide a closed-celled character to the side edges of the tile which are contiguous with edge moldings 20 and 21 when foaming occurs. Examples of such materials are silicones and release-agent coated materials such as steel or aluminum.

Typically, the phosphate material has been cast in a fluid state at a thickness of about 1/16 to about 3/16-inch on the plate. As foaming occurs, preferably a 3-fold expansion of the material will occur. It has been observed that such expansion occurs generally in a vertical, as opposed to a horizontal, manner; thus, it is desired that the foamable compositions occupy the entire open area of the bottom of the mold cavity which is formed by edge molding 20 and plate 22. It is also noted that, because there is nothing to restrain the expansion of the foam, the average cell size of the foam will tend to be fairly large in comparison to the average cell size of the second foamed phosphate composition. The foamed, low-density material 23 is seen in FIG. 4.

After the phosphate composition has been allowed to expand and cure, a second phosphate composition is disposed within the mold cavity and the cavity is covered with a restraining material 24 which will provide a closed-celled facing character to the higher density back (top) facing 25 of the eventual product. Sufficient material is disposed in the cavity such that, when foaming occurs, the foam expands within the cavity and against the sides of frame 18 and restraining lid 24. This expansion induces a relatively small pressure on foam 26 such that it tends to be of higher density than foam 23 which is seen as the decorative facing material. Because this material is of higher density, it is also of higher strength and it provides a strength characteristic to the board such that the edges, and particular tegular edges, are no longer weak and friable. The higher density also results in improved warpage control. Nevertheless, for economic reasons as well as performance reasons, it is desired that at least half of the board thickness be comprised of the lower-density foam material.

The appearances of the tile products which are formed as described above differ from that illustrated in FIG. 2. As illustrated in FIG. 5, the surface 30 of board 31 has craters 32 where the foam cells opened against plate 22 of FIG. 4. These craters are sealed and are not opened so as to expose internal cells 33.

The tile products which are formed in a mold and allowed to cure at room temperature as described above will exhibit acoustical performance which is comparable to or better than that of conventional boards formed from phosphate compositions. Surprisingly, however, it has also been discovered that, if tile products formed as described above are postheated, preferably at not less than 150° C., the tile products will exhibit a substantially improved acoustical performance. In addition, the time at which post-heating occurs appears to be important. Samples of tile which were heated at ca. 175° C. immediately (i.e., within one hour) after the curing step exhibited markedly superior performance when compared to samples that had been heated several hours later. Normally, post-heating should be achieved within 3 hours of curing. Although heating causes a loss of water, the amount of water loss itself does not appear to be important because post-heated samples appear to lose about the same percentage of water (usually 15-20%) regardless of when heating occurs.

The reason for this increased performance capability is not clearly understood; however, it may be related to the creation of microfractures in the foamed material, the fractures permitting increased access of sound waves to the interior regions of the board. The existence of such fractures has been confirmed by electron-microscopy, yet their presence does not result in a friability problem with the boards. Boards prepared from the compositions disclosed herein continue to cure for a period of time following the initial reaction. If water is driven off immediately following the initial cure, it is conceivable that microfractures are produced as the water escapes; however, as the strength of the board increases, fewer (or perhaps none) of the microfactures may be produced. While Applicants do not desire to be bound by any theory of operability, this may account for the differing acoustical results.

The acoustical measurements referred to above may be made by means well-known in the art. For example, airflow resistance may be measured according to standard procedures to provide ratings in acoustical ohms or cgs Rayls. In addition, noise reduction coefficient (NRC) measurements may be used as a basis for comparison. If acoustic ohms are used as the measure of performance, the samples should provide an airflow resistance of not more than 45 acoustic ohms, and preferably not more than 30 acoustic ohms.

Although the foregoing discussion was directed to a single plate comprising a single frame and cover, in a production environment it is envisioned that a plurality of plates, in line, may be provided with a layer of the first foamable composition. The plates may then be separated and each may be provided with a suitable frame material and cover such that each may be individually processed to provide a plurality of substantially uniformly constructed acoustical tiles.

The present invention will be better understood by reference to the examples which follow, said examples being provided by way of illustration and not limitation.

EXAMPLES

Example 1

The following compositions were used to prepare a board sample. Two different dry compositions were prepared comprising calcium silicate, magnesium oxide, magnesium carbonate foaming agent, and talc filler. In addition, a single acid solution was prepared for intermixing with both of the dryblend compositions. The formulations of the dryblend and the acid solution were as follows:

| Component | Low-Density Composition (Wt. %) | High-Density (Back-Up) Composition (Wt. %) |
|---|---|---|
| Calcium silicate | | |
| Nyad 400 | 30.10 | 30.50 |
| Nyad 325 | 30.10 | 30.50 |
| Nyad G | 19.90 | 20.14 |
| Magnesium oxide | 9.30 | 9.40 |
| Magnesium carbonate | 4.00 | 1.80 |
| Talc (Nytal 200) | 6.60 | 7.66 |

| Acid Solution | |
|---|---|
| Component | Weight Percent |
| Phosphoric acid | 75.88 |
| Aluminum oxide trihydrate | 10.07 |
| Boric acid | 1.96 |
| Water | 12.09 |

Each board was prepared in the following manner: 43.4% by weight of the low-density dryblend material was intermixed with 54.1% of 5° C. acid and 2.4% of water. The composition was immediately cast on a wax coated steel plate heated at between 37° and 55° C. The plate was immediately provided with an edge frame, and the mixture was allowed to foam and set, a process which consumed approximately five minutes. The internal temperature of the foam rose to about 65° C. during curing.

After curing was complete, a similar mixture of high-density material was prepared comprising the same quantities of the respective components, the mixture was immediately placed in the mold cavity, and the cavity was covered with a steel plate. Foaming was allowed to occur under essentially the same temperature conditions until the curing reaction was complete. Upon demolding the material, the front facing was found to have a completely open-celled character whereas the back facing was found to have an essentially closed-celled character.

EXAMPLE 2

This example will illustrate the acoustical performance of boards prepared according to Example 1 and then dried at about 175° C. for 15 to 20 minutes until approximately 18% water had been removed.

The acoustical data were obtained in the following manner using a modification of ASTM C 522-80. The determination of cgs Rayls according to the ASTM test is similar to the determination of acoustic ohms. Essentially the same equipment is used for each test; however, air flow resistance measurements are made in a different manner. The standard ASTM test is designed to move air through the face and back of a sample, perpendicular to the face and back, using a 10-inch by 10-inch square opening. Conversely, the acoustic ohms test is designed to move air laterally through the sample, parallel to the face and back of the sample. With the latter test, air is moved into the sample through the center of a soft rubber annulus having an inside diameter of 5⅜ inches and an outside diameter of 8⅜ inches. The back of the sample is effectively sealed using a weighted metal plate with a soft, impermeable rubber facing. The sample is supported on the annulus and weighted so that the 1½ wide annulus and soft rubber back effectively seal their respective areas.

Air is moved through the test sample in the acoustic ohms test in the same manner as that described for the ASTM test; i.e., air is moved by applying a given weight to one pan of the apparatus, and the time necessary to move the air through the sample is measured in seconds. Acoustic ohms are computed using essentially the same equation as that set forth in the ASTM test; however, because the apparatus is somewhat different for the acoustic ohms test, the machine constant is different for the apparatus. In addition, the result is reported in acoustic ohms rather than cgs Rayls.

Two samples were prepared, Sample 2a and Sample 2b, and selected portions were subjected to varying drying conditions. Portions of Sample 2a were dried immediately, three hours after preparation and five hours after preparation. Portions of Sample 2b were dried immediately and 24 hours after preparation. The amount of water loss and the acoustical ohm performance of each sample were as follows:

|  | Time of Drying | Water Loss (%) | | Acoustical Ohms | | Average Acoustical Ohms |
| --- | --- | --- | --- | --- | --- | --- |
| Sample 2a | Immediate | 14.5 | 15.4 | 16.5 | 17.8 | 17.2 |
|  | 3-hr. delay | 15.9 | 15.9 | 34.0 | 24.3 | 29.2 |
|  | 5-hr. delay | 15.5 | | 98.7 | | 98.7 |
| Sample 2b | Immediate | 16.4 | 15.4 | 39.4 | 40.8 | 40.1 |
|  | 24-hr. delay | 15.9 | 17.8 | 71.4 | 73.1 | 72.3 |

These results indicate that a dramatic loss in acoustical performance is observed if post-cure drying is achieved at a long time period after curing. Accordingly, the sooner the cured sample is dried, the better is the acoustical performance of the product.

The present invention is not limited to the descriptions and illustrations set forth above, but encompasses all modifications envisaged by the following claims.

What is claimed is:

1. A molded tile product, said product comprising laminated first and second foamed phosphate ceramic materials, said materials being derived from the reaction of at least one composition comprising calcium silicate, phosphoric acid, a metal oxide and a carbonate foaming agent, said first material comprising the decorative facing of said tile and being less dense than said second material, said tile having a decorative facing comprising a selected open-celled character, the edges and backing face of said tile comprising a substantially closed-celled character.

2. The product as set forth in claim 1 hereof wherein said product comprises microfractures resulting from the post-cure heating of said product.

3. The product as set forth in claim 2 hereof wherein said product has an airflow resistance of not more than 45 acoustic ohms.

4. The product as set forth in claim 3 hereof wherein said airflow resistance is not more than 30 acoustic ohms.

5. The product as set forth in claim 1 hereof wherein at least one-half of said product thickness comprises said low-density foam.

6. The product as set forth in claim 1 hereof wherein said first and second foamed materials were derived from different phosphate compositions.

* * * * *